United States Patent [19]

Boller et al.

[11] 4,395,350
[45] Jul. 26, 1983

[54] LIQUID CRYSTAL MIXTURES

[75] Inventors: Arthur Boller, Binningen; Alfred Germann, Basel; Martin Schadt, Seltisberg; Alois Villiger, Basel, all of Switzerland

[73] Assignee: Hoffmann-La Roche Inc., Nutley, N.J.

[21] Appl. No.: 279,493

[22] Filed: Jul. 1, 1981

[30] Foreign Application Priority Data

Jul. 10, 1980 [CH] Switzerland ............... 5299/80
May 7, 1981 [CH] Switzerland ............... 2966/81

[51] Int. Cl.³ .................. C09K 3/34; G02F 1/13
[52] U.S. Cl. ............... 252/299.1; 252/299.61; 252/299.63; 260/206; 260/186; 350/349
[58] Field of Search ........... 252/299.1, 299.61, 299.63; 260/206, 186; 350/349

[56] References Cited

U.S. PATENT DOCUMENTS

| 4,137,193 | 1/1979 | Osman et al. | 252/299.1 |
| 4,145,114 | 3/1979 | Coates et al. | 252/299.1 |
| 4,179,395 | 12/1979 | Cole, Jr. et al. | 252/299.1 |
| 4,273,929 | 6/1981 | Doller et al. | 252/299.1 |
| 4,304,683 | 12/1981 | Morinaka et al. | 252/255.1 |
| 4,350,603 | 9/1982 | Aftercut et al. | 252/299.1 |
| 4,359,398 | 11/1982 | Cole, Jr. et al. | 252/299.1 |
| 4,363,743 | 12/1982 | Moeller et al. | 252/299.1 |

FOREIGN PATENT DOCUMENTS

| 2815860 | 10/1978 | Fed. Rep. of Germany | 252/299.1 |
| 3028593 | 2/1981 | Fed. Rep. of Germany | 252/299.1 |
| 55-25005 | 2/1980 | Japan | 252/299.1 |
| 2069518 | 8/1981 | United Kingdom | 252/299.1 |

OTHER PUBLICATIONS

Cognard, J., et al., Mol. Cryst. Liq. Cryst., vol. 68, pp. 207-229 (1981).
Blinov, L. M., et al., J. de Physique, Coll. Cl, Suppl., No. 3, Tome 36, pp. 61-69-76 (1975).
Jones, F. et al., Mol Cryst. Liq. Cryst., vol. 60, pp. 99-110 (1980).
Cognard, J., et al., Mol. Cryst. Liq. Cryst., vol. 70, pp. 1-19 (1981).
Cox, R. J., Mol. Cryst. Liq. Cryst., vol. 55, pp. 1-32 (1979).
Bloom, A., et al., Mol. Cryst. Liq. Cryst., vol. 40, pp. 213-221 (1977).
Bloom, A., et al., Mol. Cryst. Liq. Cryst., vol. 41 (Letters), pp. 1-4 (1977).

*Primary Examiner*—Teddy S. Gron
*Attorney, Agent, or Firm*—Jon S. Saxe; Bernard S. Leon; William G. Isgro

[57] ABSTRACT

Liquid crystal mixtures containing a coloring substance which comprise about 5 to about 40 weight % of trans-p-[5-(4-alkylcyclohexyl)-2-pyrimidinyl]benzonitriles, about 10 to about 60 weight % of trans-4-alkylcyclohexane carboxylic acid phenyl esters and about 0.1 to about 15 weight % of one or more coloring substances of the formula

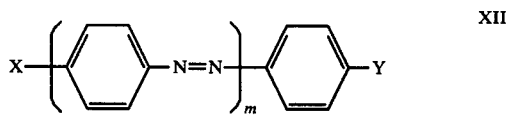

wherein m stands for the number 1 and X is alkoxy and Y is nitro; or m stands for the number 1 or 2; and X is p-alkoxyphenyl and Y is nitro or dialkylamino, or X is alkoxy and Y is -p-nitrophenyl or -(dialkylamino)phenyl; or m stands for the number 2, and X is alkoxy and Y is alkoxy, nitro or dialkylamino, or both X and Y are dialkylamino; and wherein the alkoxy denotes a straight-chain group containing 1 to 12 carbon atoms and the alkyl groups in the dialkylamino each denote a straight-chain alkyl group containing 1 to 4 carbon atoms are described.

20 Claims, No Drawings

LIQUID CRYSTAL MIXTURES

BRIEF SUMMARY OF THE INVENTION

Liquid crystal mixtures containing a coloring substance which comprise in the range of about 5 to about 40 weight % of trans-p-[5-(4-alkylcyclohexyl)-2-pyrimidinyl]benzonitriles, in the range of about 10 to about 60 weight % of trans-4-alkylcyclohexane carboxylic acid phenyl esters and in the range of about 0.1 to about 15 weight % one or more coloring substances of the formula

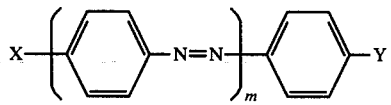

wherein m stands for the number 1 and X is alkoxy and Y is nitro; or m stands for the number 1 or 2, and X is p-alkoxyphenyl and Y is nitro or dialkylamino, or X is alkoxy and Y is p-nitrophenyl or p-(dialkylamino)phenyl; or m stands for the number 2, and X is alkoxy and Y is alkoxy, nitro or dialkylamino, or both X and Y are dialkylamino; and wherein the alkoxy denotes a straight-chain group containing 1 to 12 carbon atoms and the alkyl groups in the dialkylamino each denote a straight-chain alkyl group containing 1 to 4 carbon atoms.

In another aspect, the invention relates to coloring substances, namely the compounds of formula XII wherein simultaneously m does not stand for the number 1, X is not alkoxy and Y is not nitro.

In yet another aspect, the invention relates to the method of using the compounds of formula XII in liquid crystal mixtures.

DETAILED DESCRIPTION OF THE INVENTION

The invention relates to coloring substance-containing liquid crystal mixtures, their manufacture and their use in electro-optical apparatuses, as well as coloring substances.

The mixtures of the invention are characterized in that they contain about 5 to about 40 weight % of one or more trans-p-[5-(4-alkylcyclohexyl)-2-pyrimidinyl]-benzonitriles of the formula

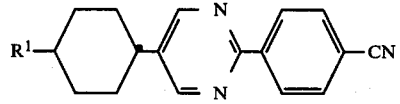

wherein $R^1$ is straight-chain alkyl containing 2 to 7 carbon atoms, about 10 to about 60 weight % of one or more trans-4-alkylcyclohexane carboxylic acid phenyl esters of the formula

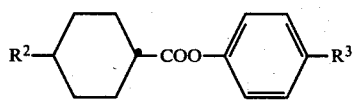

wherein $R^2$ is a straight-chain alkyl containing 2 to 6 carbon atoms and $R^3$ is cyano or a straight-chain alkoxy containing 1 to 6 carbon atoms, and about 0.1 to about 15 weight % of one or more coloring substances of the formula

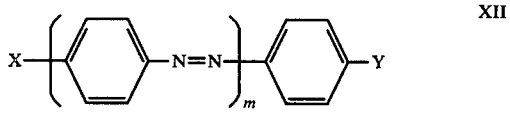

wherein m is the integer 1 and X is alkoxy and Y is nitro; or m is the integer 1 or 2, and X is p-alkoxyphenyl and Y is nitro or dialkylamino, or X is alkoxy and Y is p-nitrophenyl or p-(dialkylamino)phenyl; or m is the integer 2, and X is alkoxy and Y is alkoxy, nitro or dialkylamino, or both X and Y are dialkylamino; and wherein the alkoxy denotes a straight-chain group containing 1 to 12 carbon atoms and the alkyl groups in the dialkylamino each denote a straight-chain group containing 1 to 4 carbon atoms.

As used herein, the term "straight-chain alkyl" group and the alkyl part of a "straight-chain alkoxy" group denote, depending on the number of carbon atoms specified, methyl, ethyl, propyl, butyl, pentyl, hexyl, heptyl, octyl, nonyl, decyl, undecyl and dodecyl.

The coloring substances present in a coloring substance-containing liquid crystal mixture of the invention must, in order to be suitable for electro-optical purposes, fulfil several requirements. They must be chemically stable and must not be ionized in an electric field, because otherwise the conductivity of the mixture would be increased in an undesirable manner. Further, they must exhibit a good stability towards UV-radiation. It is also important that they have suitable spectra, since the color impression is influenced by the spectral distribution, and when several coloring substances are used the breadth of the possible color spectrum can be limited. Moreover, the coloring substances must have a high extinction and must be fully soluble in the liquid crystal matrix used. Moreover, the liquid crystalline range of the matrix should be reduced as little as possible by the addition of a coloring substance. The coloring substances used must be compatible with one another and with the liquid crystal matrix, that is, no reactions of the components of the mixture should occur, especially no photochemical reactions which can be caused by absorption of an admixed coloring substances, that is, they should not act as a sensitizer. In order to achieve a high contrast in liquid crystal displays, in which any form of the "guest-host effect" is used, a large degree of order of the coloring substance is also necessary. In this connection, the choice of suitable liquid crystal components must also be taken into consideration, because the degree of order and the solubility depend on the liquid crystal matrix used.

The hitherto used coloring substance-containing liquid crystal mixtures above all had the disadvantage that either the solubility and the degree of order of the coloring substance were too small or the stability towards UV-radiation was insufficient.

It has now been found that the coloring substances of formula XII fulfil all of the requirements mentioned earlier when they are used in liquid crystal mixtures containing compounds of formulas I and II. In particular, the compounds of formula XII are to a large extent themselves liquid crystalline, which means that the liquid crystalline range of the basic mixture is often slightly increased by the addition of coloring substances of formula XII.

Formula XII hereinbefore embraces not only yellow coloring substances, namely, the compounds of the formula

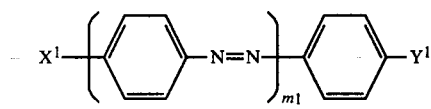

XIII wherein $m_1$ is the integer 1, and $X^1$ is alkoxy and $Y^1$ is nitro, p-nitrophenyl or p-(dialkylamino)-phenyl, or $X^1$ is p-alkoxyphenyl and $Y^1$ is nitro or dialkylamino; or $m_1$ is the integer 2, and $X^1$ is p-alkoxyphenyl and $Y^1$ is nitro, or $X^1$ is alkoxy and $Y^1$ is p-nitrophenyl, alkoxy or nitro; and wherein the alkoxy denotes a straight-chain group containing 1 to 12 carbon atoms and the alkyl groups in the dialkylamino each denote a straight-chain alkyl group containing 1 or 4 carbon atoms, but also red coloring substances, namely, the compounds of the formula

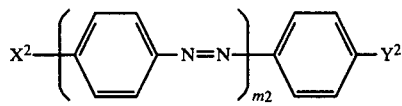

XIV wherein $m_2$ is the integer 2, and $X^2$ is p-alkoxyphenyl and $Y^2$ is dialkylamino, or $X^2$ is alkoxy and $Y^2$ is p-(dialkylamino) phenyl or dialkylamino, or both $X^2$ and $Y^2$ are dialkylamino; and wherein the alkoxy denotes a straight-chain group containing 1 to 12 carbon atoms and the alkyl groups in the dialkylamino each denote a straight-chain alkyl group containing 1 to 4 carbon atoms.

The mixtures of the invention preferably contain about 0.1 to about 10 weight % of one or more compounds of formula XIII and/or about 0.1 to about 5 weight % of one or more compounds of formula XIV.

Other colors can be generated by mixing the compounds of formulas XIII and XIV and/or adding one or more additional coloring substances. The compounds of the formula

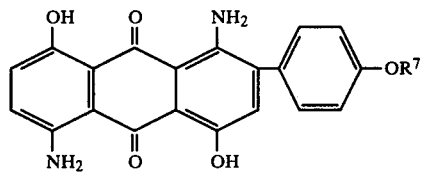

VI wherein $R^7$ is a straight-chain alkyl containing 5 to 8 carbon atoms, are especially suitable as additional coloring substances. The compounds of formula VI are blue coloring substances. In mixtures which also contain one or more coloring substances of formula VI, the amount of these coloring substances conveniently amounts to about 0.1 to about 5 weight %, preferably up to about 3 weight %.

The coloring substances of formulas XII and VI are distinguished above all by their high degree of order and the good solubility in mixtures with compounds of formulas I and II, as well as by a good UV stability. In particular, the latter must be considered to be extremely surprising for the compounds of formula XII, because azo coloring substances generally have only limited UV stability. Since the glass plates in electro-optical indicating apparatuses act, moreover, as a UV filter, the mixtures in accordance with the invention enable the manufacture of indicating apparatuses having a high life-span which can be increased further by the incorporation of additional UV filters. Since the absorption range of the compounds of formulas XII and VI is well complemented, liquid crystal mixtures of practically any color can be prepared by suitable mixtures, especially also black mixtures. Furthermore, these coloring substances are compatible. Moreover, the mixtures in accordance with the invention have insignificant viscosities, a large positive anisotropy of the dielectric constants, low threshold potentials and short recall times when used in electro-optical apparatuses.

Because of the high degree of order of the coloring substances in the mixtures of the invention, which is especially true for the compounds of formula XII containing at least 3 benzene rings, a high contrast can be achieved in electro-optical apparatuses even without the use of polarizers. Due to these facts, the display is still clearly visible even when the angle between the plane of the display and the direction of observation is very small. This is especially true even for the black mixtures which comprise the preferred embodiment of the invention.

An example of the mixtures of the invention which, besides the compounds of formulas I and II, contain, as the coloring substances formula XII, one or more compounds characterized by the formulas

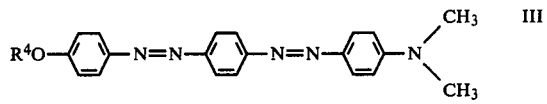

III wherein $R^4$ is a straight-chain alkyl containing 1 to 9 carbon atoms, and/or

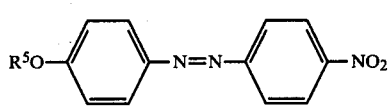

IV wherein $R^5$ is a straight-chain alkyl containing 1 to 9 carbon atoms. It is noted that formulas III and IV, represent compounds encompassed by formula XII.

In the foregoing mixtures, the compounds of formula III are present in an amount of 0 to about 3 weight % and the compounds of formula IV are present in amount of 0 to about 10 weight %, and the amount of coloring substances of formulas III and IV together amounts to at least about 0.3 weight %. A coloring substance total concentration of about 1 to about 10 weight % is preferred, and about 1.5 to about 7 weight % of compounds of formulas III and IV is especially preferred.

The compounds of formuls XII and VI can be prepared in an analogous manner to known azo and anthraquinone coloring substances.

The compounds of formula III can be prepared, for example, by etherifying a compound of formula III in which $R^4$ is hydrogen, which is known from Meldola, J.Chem. Soc. 45[1884] 111; Beilstein 16, 337, with the corresponding 1-bromoalkane in ethanol in the presence of potassium carbonate.

The preparation of compounds of formula IV in which $R^5$ is alkyl can be carried out, for example, by etherifying 4-nitro-4'-hydroxy-azobenzene, which is known from Chem. Ber. 38 [1905] 3208, with the corresponding 1-bromoalkane in ethanol in the presence of potassium carbonate.

A compound of formula XII in which X and Y are alkoxy and m stands for the integer 2 can be prepared, for example, by reducing the nitro group in the corresponding compound of formula IV with sodium hydrogen sulfide in ethanol according to Houben-Weyl XI/1, 418, to the amino group, converting the resulting 4-amino-4'-alkoxyazobenzene with sodium nitrite and hydrochloric acid into the diazonium chloride and reacting this with phenol and sodium hydroxide and subsequently etherifying the resulting compound with the corresponding 1-bromoalkane in ethanol in the presence of potassium carbonate and sodium iodide.

The preparation of a compound of formula XII in which m is the integer 2 and X is alkoxy and Y is nitro can be carried out, for example, by reacting an aforementioned 4-amino-4'-alkoxyazobenzene with 4-nitro-nitrosobenzene analogously as set out in Chem. Ber. 88(1955) 1673.

The preparation of a compound of formula XII in which m is the integer 2 and X is alkoxy and Y is dialkylamino can be carried out, for example, by converting a 4-amino-4'-alkoxyazobenzene with sodium nitrite and hydrochloric acid into the diazonium salt and reacting this with a N,N-dialkylaniline.

A compound of formula XII in which m is the integer 2 and X and Y is dialkylamino, can be prepared, for example, by converting p-nitroaniline with sodium nitrite and hydrochloric acid into the diazonium salt, reacting this with a N,N-dialkylaniline, reducing the resulting compound with sodium hydrogen sulfide in ethanol to give a 4-amino-4'-(dialylamino)azobenzene, again converting this with sodium nitrite and hydrochloric acid into the diazonium salt and then reacting the diazonium salt with a N,N-dialkylaniline.

The compounds of formula XII in which m is the integer 1 and X is p-alkoxyphenyl and Y is nitro can be prepared, for example, starting from 4-amino-4'-hydroxybiphenyl, which is known from Chem. Ber. 27 (1894) 2629, by reaction with 4-nitro-nitrosobenzene analogously as set out in Chem. Ber. 88 (1955) 1673, and subsequently etherifying the hydroxy group with a 1-bromoalkane in ethanol in the presence of potassium carbonate and sodium iodide.

The compounds of formula XII in which m is the integer 1 and X is p-alkoxyphenyl and Y is dialkylamino similarly can be prepared starting from 4-amino-4'-hydroxybiphenyl by conversion into the diazonium salt with sodium nitrite and hydrochloric acid, and subsequent reaction with a N,N-dialkylaniline followed by etherification of the hydroxy group with a 1-bromoalkane in ethanol in the presence of potassium carbonate.

The preparation of compounds of formula XII in which m is the integer 2 and X is p-alkoxyphenyl and Y is nitro can be carried out, for example, by reacting 4-amino-4'-hydroxybiphenyl with 4-nitro-nitrosobenzene, etherifying the hydroxy group with a 1-bromoalkane in ethanol in the presence of potassium carbonate and sodium iodide, reducing the nitro group with sodium hydrogen sulfide in ethanol to the amino group and finally reacting the resulting compound with 4-nitro-nitrosobenzene.

The preparation of a compound of formula XII in which m is the integer 2 and X is p-alkoxyphenyl and Y is dialkylamino can be carried out, for example, starting from the corresponding compound of formula XII in which X is p-alkoxyphenyl, Y is nitro and m is the integer 1 (described earlier) by reduction of the nitro group with sodium hydrogen sulfide, conversion of the resulting compound into the diazonium salt with sodium nitrite and hydrochloric acid and reaction of the diazonium salt with a N,N-dialkylaniline.

The compounds of formula XII in which m is the integer 1 and X is alkoxy and Y is p-nitrophenyl can be prepared, for example, by diazotizing 4-nitro-4'-aminobiphenyl which is known from J. Chem. Soc. 1931, 1361, with sodium nitrite and hydrochloric acid, coupling the diazonium salt with phenol and etherifying the hydroxy group with a 1-bromoalkane in ethanol in the presence of potassium carbonate and sodium iodide.

The preparation of a compound of formula XII in which m is the integer 2 and X is alkoxy and Y is p-nitrophenyl can be carried out, for example, by reacting 4-nitro-4'-aminobiphenyl with 4-nitro-nitrosobenzene, partially reducing the resulting compound with sodium hydrogen sulfide in ethanol according to Houben-Weyl XI/1, 418, to give 4-amino-4'-(p-nitrophenyl)azobenzene, diazotizing this with sodium nitrite and hydrochloric acid, coupling the diazonium salt with phenol and etherifying the resulting compound with a 1-bromoalkane in ethanol in the presence of potassium carbonate and sodium iodide.

The compounds of formula XII in which m is the integer 1 or 2 and X is alkoxy and Y is p-(dialkylamino)-phenyl can be prepared, for example, from the corresponding nitro compounds described in the two preceding paragraphs by first reducing the nitro group with sodium hydrogen sulfide in ethanol and subsequently alkylating the amino group, for example, with an aldehyde, for example, $C_1$-$C_4$-alkanal, in formic acid or with an alkyl iodide or alkyl sulfate.

The preparation of the coloring substances of formula VI can be carried out, for example, according to the methods described by R. J. Lahoti et al. in Indian J. Chem. Sect. B 11[978] 1041.

The preferred compounds of formula XII are those which contain 3 benzene rings. Further, those compounds of formula XII in which alkoxy is a straight-chain group containing 3 to 9, particularly 5 to 7, carbon atoms and alkyl in the dialkylamino groups is methyl or ethyl, particularly methyl, are preferred.

Examples of preferred compounds of formula XII are those in which m, X and Y have the significances which follow [$\epsilon_\lambda$=molar extinction in ethanol at wavelength $\lambda$[nm]]:

m=1, X=methoxy, Y=nitro: $\epsilon_{373}$=25990;

m=1, X=butyloxy, Y=nitro: $\epsilon_{375}$=28135;

m=1, X=heptyloxy, Y=nitro: m.p. 82.3°–83.2° C., cl.p. 96.4° C., smectic-nematic conversion 93.7° C., $\epsilon_{378}$=27140;

m=1, X=p-heptyloxyphenyl, Y=nitro, m.p. 146.9°–148.2° C., cl.p. 257.7°–258.1° C., smectic-nematic conversion 238.2° C., $\epsilon_{390}$=28180;

m=1, X=p-heptyloxyphenyl, Y=dimethylamino: m.p. 171.6°–173.9° C., cl.p. 246.7°–247.3° C., $\epsilon_{421}=37190$;

m=1, X=heptyloxy, Y=p-nitrophenyl;

m=1, X=heptyloxy, Y=p-(dimethylamino)phenyl;

m=2, X=butyloxy, Y=butyloxy: $\epsilon_{388}=41865$;

m=2, X=butyloxy, Y=heptyloxy: $\epsilon_{392}=47625$;

m=2, X=heptyloxy, Y=heptyloxy;

m=2, X=heptyloxy, Y=nitro: m.p. 165.6°–166.7° C., cl.p. >300° C. (decomposition, smectic), $\epsilon_{395}=42160$;

m=2, X=heptyloxy, Y=dimethylamino: m.p. 154.8°–156.9° C., cl.p. 268.2°–270.0° C. (nematic), $\epsilon_{474}=41240$;

m=2, X=dimethylamino, Y=dimethylamino: m.p. 288.0° C. (decomposition), cl.p. >300° C., $\epsilon_{500}=53360$;

m=2, X=p-heptyloxyphenyl, Y=nitro;

m=2, X=p-heptyloxyphenyl, Y=dimethylamino: m.p. 201.3°–203.0° C., cl.p. >300° C. (decomposition) $\epsilon_{480}=40970$;

m=2, X=heptyloxy, Y=p-nitrophenyl;

m=2, X=heptyloxy, Y=p-(dimethylamino)phenyl.

The compounds of formula IV are known.

The remaining compounds of formula XII, that is, the compounds of the formula

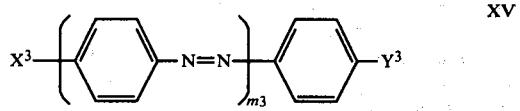

XV wherein m₃ is the integer 1 or 2, and X³ is p-alkoxyphenyl and Y³ is nitro or dialkylamino, or X³ is alkoxy and Y³ is p-nitrophenyl or p-(dialkylamino)phenyl; or m₃ is the integer 2, and X³ is alkoxy and Y³ is alkoxy, nitro or dialkylamino, or both X³ and Y³ are dialkylamino; and wherein the alkoxy denotes a straight-chain group containing 1 to 12 carbon atoms and the alkyl groups in the dialkylamino each denote a straight-chain alkyl group containing 1 to 4 carbon atoms, also form part of the invention.

The optimum concentrations of coloring substance depend, inter alia, on the thickness of the liquid crystal cell which is used. However, they conveniently lie within the limits given earlier. A total concentration of compounds of formulas VI and XII in the range of about 0.3 to about 10 weight % is preferred, and a total concentration in the range of about 0.3 to about 5 weight % is especially preferred. The ratio when several coloring substances are used is mainly determined by the desired color of the mixture and the spectrum of the individual color components. The coloring substance content of black mixtures conveniently consists of about 0.3 to about 1.4 parts by weight of compounds of formula XIII, about 0.4 to about 1.4 parts by weight of compounds of formula XIV and about 1.0 to about 2.2 parts by weight of compounds of formula VI. The preferred ratio or range in the case of black mixtures comprises from about 0.8 to about 1.2 parts by weight of compounds of formula XIII, about 0.75 to about 1.15 parts by weight of compounds of formula XIV and about 1.4 to about 2.2 parts by weight of compounds of formula VI, especially when the compounds of formulas XIII and XIV used are coloring substances of formula III or IV.

The compounds of formulas I and II are known compounds and are described in Z, Naturforsch. 34b, 1535–1541 (1979) or in German Auslegeschrift No. 24 29 093.

The mixtures in accordance with the invention can contain additional nematic and/or non-nematic substances in addition to the compounds of formulas I–IV and VI. Preferred additional components of the mixtures are:

Up to about 50 weight % of one or more 4-cyanobiphenyls of the formula

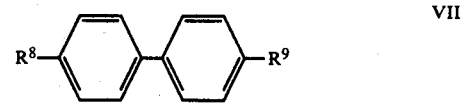

VII wherein R⁸ is straight-chain alkyl or alkoxy containing 2 to 8 carbon atoms and R⁹ is cyano, and/or up to about 30 weight %, preferably up to about 20 weight %, of one or more p-(5-alkyl-2-pyrimidinyl)-benzonitriles of the formula

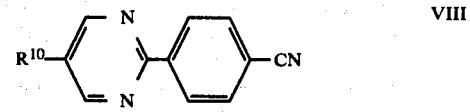

VIII wherein R¹⁰ is straight-chain alkyl containing 2 to 7 carbon atoms and/or up to about 10 weight % of one or more 4″-alkyl-4-cyano-p-terphenyls of the formula

IX wherein R¹¹ is straight-chained alkyl containing 3 to 7 carbon atoms, and/or up to about 15 weight % of one or more p-alkyl-benzoic acid p′-cyanophenyl esters of the formula

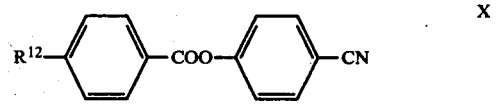

X wherein R¹² is straight-chain alkyl containing 2 to 7 carbon atoms, and/or up to about 12 weight % of one or more 2-(4-cyanophenyl)-5-(4-alkylphenyl)pyrimidines of the formula

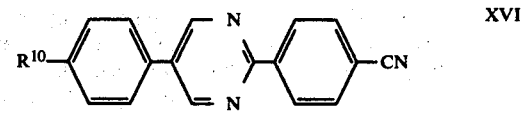

XVI wherein R¹⁰ is straight-chain alkyl containing 2 to 7 carbon atoms.

The compounds of formulas VII–X and XVI are known compounds. Examples of preferred compounds of formulas I, II, and VII–X and XVI are:

Trans-p-[5-(4-ethylcyclohexyl)-2-pyrimidinyl]benzonitrile,
trans-p-[5-(4-propylcyclohexyl)-2-pyrimidinyl]benzonitrile,
trans-p-[5-(4-butylcyclohexyl)-2-pyrimidyl]benzontrile,
trans-p-[5-(4-pentylcyclohexyl)-2-pyrimidinyl]benzonitrile,
trans-p-[5-(4-heptylcyclohexyl)-2-pyrimidinyl]benzonitrile,
trans-4-propylcyclohexane carboxylic acid p-cyanophenyl ester,
trans-4-butylcyclohexane carboxylic acid p-cyanophenyl ester,
trans-4-pentylcyclohexane carboxylic acid p-cyanophenyl ester,
trans-4-butylcyclohexane carboxylic acid p-(ethoxy)phenyl ester,
trans-4-butylcyclohexane carboxylic acid p-(hexyloxy)phenyl ester,
trans-4-pentylcyclohexane carboxylic acid p-(methoxy)phenyl ester,
trans-4-pentylcyclohexane carboxylic acid p-(propyloxy)phenyl ester,
4'-pentyl-4-cyanobiphenyl,
4'-heptyl-4-cyanobiphenyl,
4'-pentyloxy-4-cyanobiphenyl,
4'-octyloxy-4-cyanobiphenyl,
p-(5-pentyl-2-pyrimidinyl)benzonitrile,
p-(5-heptyl-2-pyrimidinyl)benzonitrile,
4''-pentyl-4-cyano-p-terphenyl,
p-butylbenzoic acid p'-cyanophenyl ester,
p-pentylbenzoic acid p'-cyanophenyl ester,
2-(4-cyanophenyl)-5-(4-propylphenyl)pyrimidine and
2-(4-cyanophenyl)-5-(4-butylphenyl)pyrimidine.

The preferred concentration range comprises about 10 to about 30 weight % for the compounds of formula I and about 20 to about 50 weight % for the compounds of formula II.

The mixtures of the invention can, moreover, contain a suitable optically active additive. Such additives produce in the liquid crystal mixture, in the absence of an external field, a helix structure and increase the extinction. In principle, any, even non-liquid crystalline, stable, non-ionizing, optically active organic compounds are suitable for this purpose. However, preferably, optically active compounds of the formula

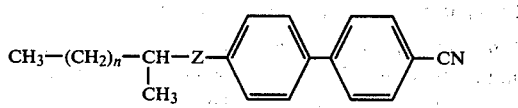

wherein Z signifies the group —CH$_2$— or —CH$_2$O— and n signifies a whole number of 1 to 4, are used.

The optimum concentration of the optically active compounds depends mainly on the nature of the compound, on the desired pitch of the mixture and on the thickness of the electro-optical cell which is used.

In general, the mixtures of the invention can contain 0 to about 4 weight % of optically active compounds. When compounds of formula XI are used as optically active additives in displays having a cell thickness of 10 μm, then, for example, an amount of about 2.5 to about 4.0 weight % is preferred.

Preferred compounds of formula XI are:

(+)-4'-(2-methylbutyl)-4-cyanobiphenyl,
(+)-4'-(2-methylbutyloxy)-4-cyanobiphenyl and their optical antipodes.

The preparation of the mixtures of the invention can be carried out in a known manner; for example, by heating a mixture of the components to a temperature barely above the clearing point and subsequently cooling the mixture.

The preparation of an electro-optical apparatus containing a mixture of the invention can likewise be carried out in a known manner; for example, by evacuating a suitable cell and introducing the mixture into the evacuated cell.

Examples of especially preferred nematic or cholesteric mixtures are the mixture Examples 1–11 which follow. In each example one of the basic mixtures A–C was used as the liquid crystal matrix. S denotes the degree of order, $\lambda_{max}$ denotes the wavelength of the absorption maximum, measured in the mixture, and $\epsilon_{max}$ denotes the pertinent molar isotropic extinction of the coloring substance in ethanol, $t_{70}$ denotes the time in which the extinction drops to 70% of the original extinction upon irradation with a xenon lamp of 1.1 kW at 22 cm distance. Mixture Example 5 gives the corresponding values for a blue coloring substance of formula VI.

The Examples which follow further illustrate the invention: All temperatures are in degrees centigrade and all percentages are by weight unless otherwise stated.

Basic mixture A 8.03 weight % of trans-p-[5-(4-ethylcyclohexyl)-2-pyrimidinyl]benzonitrile,
5.74 weight % of trans-p-[5-(4-pentylcyclohexyl)-2-pyrimidinyl]benzonitrile,
14.94 weight % of trans-p-[5-(4-heptylcyclohexyl)-2-pyrimidinyl]benzonitrile,
7.94 weight % of trans-4-propylcyclohexane carboxylic acid p-cyanophenyl ester,
7.22 weight % of trans-4-pentylcyclohexane carboxylic acid p-cyanophenyl ester,
14.68 weight % of trans-4-butylcyclohexane carboxylic acid p-(ethoxy)phenyl ester,
13.11 weight % of trans-4-pentylcyclohexane carboxylic acid p-(methoxy)phenyl ester,
28.34 weight % of 4'-pentyl-4-cyanobiphenyl, m.p. < −20° C.; cl.p. 97.2°–98.2° C.; nematic.

Basic mixture B 11.98 weight % of trans-p-[5-(4-ethylcyclohexyl)-2-pyrimidinyl]benzonitrile,
9.14 weight % of trans-p-[5-(4-pentylcyclohexyl)-2-pyrimidinyl]benzonitrile,
22.94 weight % of trans-4-butylcyclohexane carboxylic acid p-(ethoxy)phenyl ester.
24.71 weight % of 4'-heptyl-4-cyanobiphenyl,
6.02 weight % of p-(5-pentyl-2-pyrimidinyl)benzonitrile,
13.40 weight % of p-(5-heptyl-2-pyrimidinyl)benzonitrile, 11.81 weight % of 2-(4-cyanophenyl)-5-(4-butylphenyl)pyrimidine, m.p. < −20° C.; cl.p. 101° C.; nematic.

Basic mixture C 12.52 weight % of trans-p-[5-(4-ethylcyclohexyl)-2-pyrimidinyl]benzonitrile,
16.50 weight % of trans-p-[5-(4-heptylcyclohexyl)-2-pyrimidinyl]benzonitrile,
15.54 weight % of trans-4-propylcyclohexane carboxylic acid p-cyanophenyl ester,
9.71 weight % of trans-4-butylcyclohexane carboxylic acid p-cyanophenyl ester,
15.54 weight % of trans-4-pentylcyclohexane carboxylic acid p-cyanophenyl ester,
7.19 weight % of p-(5-pentyl-2-pyrimidinyl)benzonitrile,
15.00 weight % of p-(5-heptyl-2-pyrimidinyl)benzonitrile,
8.00 weight % of p-butylbenzoic acid p'-cyanophenyl ester, m.p. < −20°0 C.; cl.p. 105° C.; nematic.

Mixture Example 1

7.73 weight % of trans-p-[5-(4-ethylcyclohexyl)-2-pyrimidinyl]benzonitrile,
5.52 weight % of trans-p-[5-(4-pentylcyclohexyl)-2-pyrimidinyl]benzonitrile,
14.38 weight % of trans-p-[5-(4-heptylcyclohexyl)-2-pyrimidinyl]benzonitrile,
7.64 weight % of trans-4-propylcyclohexane carboxylic acid p-cyanophenyl ester,
6.95 weight % of trans-4-pentylcyclohexane carboxylic acid p-cyanophenyl ester,
14.13 weight % of trans-4-butylcyclohexane carboxylic acid p-(ethoxy)phenyl ester,
12.62 weight % of trans-4-pentylcyclohexane carboxylic acid p-(methoxy)phenyl ester,
27.28 weight % of 4'-pentyl-4-cyanobiphenyl,
0.95 weight % of coloring substance of formula III in which $R^4$ is heptyl,
1.00 weight % of coloring substance of formula IV in which $R^5$ is methyl,
1.80 weight % of coloring substance of formula VI in which $R^7$ is heptyl, m.p. < −20° C.; cl.p. 99.7°–101.7° C.; black.

Mixture Example 2

Basic mixture A+1.5 weight % of coloring substance of formula III in which $R^4$ is heptyl: red; S=0.80; $\lambda_{max}$=484 nm, $\epsilon_{max}$=4.12·10$^4$; $t_{70}$>700 h.

Mixture Example 3

Basic mixture A+7 weight % of coloring substance of formula IV in which $R^5$ is methyl; yellow; S=0.66; $\lambda_{max}$=383 nm, $\epsilon_{max}$=2.6·10$^4$; $t_{70}$>900 h.

Mixture Example 4

Basic mixture A+10 weight % of coloring substance of formula IV in which $R^5$ is heptyl; yellow; S=0.71; $\lambda_{max}$=383 nm, $\epsilon_{max}$=2.6·10$^4$; $t_{70}$>900 h.

Mixture Example 5

Basic mixture A+1.5 weight % of coloring substance of formula VI in which $R^7$ is heptyl; blue; S=0.72; $\lambda_{max}$=599 nm, $\epsilon_{max}$=2.5·10$^4$; $\lambda_{max}$=643 nm, $\epsilon_{max}$=3.02·10$^4$; m.p. < −20° C.; cl.p. 97.5°–99.6° C.; $t_{70}$>1000 h.

Mixture Example 6

Basic mixture A+0.5 weight % of coloring substance of formula XII in which m stands for the number 2 and X and Y is dimethylamino groups; red; S=0.77; $\lambda_{max}$=507 nm, $\epsilon_{max}$=4.31·10$^4$; $t_{70}$>200 h.

Mixture Example 7

Basic mixture A+0.7 weight % of coloring substance of formula XII in which m stands for the number 2, X is butyloxy and Y is heptyloxy; yellow; S=0.80; $\lambda_{max}$=402 nm, $\epsilon_{max}$=4.67·10$^4$; $t_{70}$=610 h.

Mixture Example 8

Basic mixture A+4 weight % of coloring substance of formula XII in which m stands for the number 1, X is p-heptyloxyphenyl and Y is nitro; yellow; S=0.78; $\lambda_{max}$=406 nm, $\epsilon_{max}$=2.82·10$^4$; $t_{70}$>600 h.

Mixture Example 9

Basic mixture A+
0.7 weight % of coloring substance of formula XII in which m stands for the number 1, X is p-heptyloxyphenyl and Y is nitro,
1.3 weight % of coloring substance of formula III in which $R^4$ is heptyl,
0.1 weight % of coloring substance of formula XII in which m stands for the number 2 and X and Y is dimethylamino groups,
1.7 weight % of coloring substance of formula VI in which $R^7$ is heptyl,
3.6 weight % of (+)- or (−)-4'-(2-methylbutyl)-4-cyanobiphenyl; black; suitable for a display with 10 μm cell thickness (cholesteric).

Mixture Example 10

Basic mixture B+1.3 weight % of coloring substance of formula III in which $R^4$ is heptyl; red; S=0.81; $\lambda_{max}$=484 nm, $\epsilon_{max}$=4.12·10$^4$; $t_{70}$>700 h.

Mixture Example 11

Basic mixture C+0.3 weight % of coloring substance of formula XII, in which m stands for the number 1, X is p-heptyloxyphenyl and Y is nitro; yellow; S=0.78; $\lambda_{max}$=406 nm, $\epsilon_{max}$=2.82·10$^4$; $t_{70}$>600 h.

The preparation of the compounds of formula XII of the invention is illustrated by the following Examples.

EXAMPLE 1

Preparation of 4-nitro-4'-heptyloxy-azobenzene

A mixture of 3.1 g of 4-nitro-4'-hydroxy-azobenzene, 15 mg of sodium iodide, 2.27 g of 1-bromo-heptane, 1.8 g of potassium carbonate and 20 ml of ethanol is heated under reflux for 60 hours. The solvent is removed in vacuo, water is added and the mixture is exhaustively extracted with methylene chloride. The residue of 4.0 g (brown crystals) of 4-nitro-4'-heptyloxy-azobenzene, which remains after drying with sodium sulfate and removing the solvent by evaporation, is chromatographed on a column of 200 g of silica gel with methylene chloride. By recrystallization of the uniform fractions from acetone/hexane there is obtained the pure compound as orange crystals; m.p. 82.3°–83.2° C., liquid crystalline, conversion at 93.7° C., cl.p. 96.4° C.

EXAMPLE 2

Preparation of [N,N-dimethyl-aniline]-(4 azo 1)-benzene-(4 azo 4)-phenol heptyl ether A mixture of 6.2 g of [N,N-dimethyl-aniline]-(4 azo 1)-benzene-(4 azo 4)-phenol, 20 mg of sodium iodide, 3.2 g of 1-bromo-heptane, 2.5 g of potassium carbonate and 20 ml of ethanol is heated under reflux for 22 hours while stirring. The solvent is removed in vacuo, water is added and the mixture is exhaustively extracted with methylene chloride. The residue of 7.2 g (red-brown crystals) of [N,N-dimethyl-aniline]-(4 azo 1)-benzene-(4 azo 4)-phenol heptyl ether, which remains, after drying with sodium sulfate and removing the solvent by evaporation, is chromatographed on a column of 350 g of silica gel. Hexane/toluene (1:1), toluene and toluene/acetone (1%) are used for the elution. By recrystallization of the uniform fractions from methylene chloride/isopropanol there is obtained the pure substance as red-brown crystals; m.p. 154.8°–156.9° C. liquid crystal-line, cl.p. 268.2°–270.0° C.

EXAMPLE 3

Preparation of 4-nitro-4'-(4-heptyloxyphenyl)azobenzene 0.35 g of 4-nitro-nitrosobenzene was dissolved in 10 ml of warm glacial acetic acid and warmed in an oil-bath of 70° C. Subsequently, a solution of 0.45 g of 4-amino-4'-hydroxybiphenyl (heated to 110° C.) was added and the mixture was held at 70° C. for an additional 30 minutes. After cooling to room temperature, the resulting suspension was extracted 3 times with 300 ml of methylene chloride and the extract was washed successively with 200 ml water, 200 ml of 10% sodium bicarbonate solution and 200 ml of water, dried over sodium sulfate and evaporated in vacuo. 0.6 g of orange crystals of 4-nitro-4'-(4-hydroxyphenyl)azobenzene was obtained.

0.6 g of 4-nitro-4'-(4-hydroxyphenyl)azobenzene was suspended in 40 ml of hot ethanol, placed in a sulfonation flask and rinsed with 10 ml of ethanol. Then, 0.336 g of 1-bromoheptane, 0.260 g of potassium carbonate and a spatula tip of sodium iodide were added and the dark brown suspension was stirred under reflux for 16 hours. Since starting material was still present, an additional 0.342 g of 1-bromoheptane and 0.260 g of potassium carbonate were added and the mixture was boiled under reflux for an additional 4 hours. Subsequently, the mixture was concentrated to dryness in vacuo, suspended in 30 ml of toluene and chromatographed on silica gel with 1.0 l of toluene and 0.8 l of toluene/acetone (2%). There was thus obtained 0.276 of 4-nitro-4'-(4-heptyloxy-phenyl)azobenzene which was recrystallized from methylene chloride/hexane: m.p. 146.9°–148.2° C.; cl.p. 257.7°–258.1° C.; smectic-nematic conversion 238.2° C.; $\epsilon_{252}=15480$, $\epsilon_{294}=13830$, $\epsilon_{390}=28180$.

EXAMPLE 4

Preparation of 4-(dimethylamino)-4'-(4'-heptyloxy-4-biphenylylazo)-azobenzene 835 mg of 4-nitro-4'-(4-heptyloxyphenyl)azobenzene (prepared according to Example 3) were suspended in 7 ml of ethanol and warmed to slight reflux (78° C.) while stirring. Then, 6.2 ml of a 25% sodium hydrogen sulfide solution were added dropwise within 35 minutes and the suspension was boiled at reflux while stirring for an additional 1 hour. After cooling to room temperature, 13 ml of water were added, the mixture was suction filtered, back-washed with 5 ml of water/ethanol (3:1) and dried in vacuo at 50° C. over potassium hydroxide. There were thus obtained 787 mg of grey crystals of 4-amino-4'-(4-heptyloxyphenyl)azobenzene.

To a suspension of 787 mg of 4-amino-4'-(4-heptyloxyphenyl)azobenzene in 2 ml of hydrochloric acid/water (1:1) were added about 3 g of ice. With additional cooling by means of an ice-bath, there were added while stirring 146 mg of sodium nitrite (purity 90%) in solid form and the mixture was stirred for an additional 30 minutes. Subsequently, the mixture was suction filtered, back-washed with a small amount of water and dried in vacuo over potassium hydroxide. There were thus obtained 778 mg of dark brown crystals of the diazonium salt of 4-amino-4'-(4-heptyloxyphenyl)azobenzene.

242 mg of dimethylaniline, 10 ml of glacial acetic acid and 5 ml of water were placed in a sulfonation flask and cooled to 3° C. while stirring. Subsequently, 778 mg of the diazonium salt of 4-amino-4'-(4-heptyloxyphenyl)azobenzene were added and the dark brown mixture was stirred at 3° C. for an additional 30 minutes. Then, 0.6 g of sodium acetate was added and the mixture was stirred at 3° C. for an additional 30 minutes and thereafter at room temperature for 1.5 hours. The mixture was suction filtered, back-washed with a small amount of water and the residue was dried in vacuo over potassium hydroxide. There were obtained 753 mg of black crystals of 4-(dimethylamino)-4'-(4'-heptyloxy-4-biphenylylazo)-azobenzene which was purified by chromatography on silica gel with toluene and then recrystallized from methylene chloride/isopropanol; m.p. 201.3°–203.0° C.; cl.p. 300° C. (decompositon); $\epsilon_{246}=19060$, $\epsilon_{480}=40970$.

We claim:

1. A coloring substance-containing liquid crystal mixture which comprises about 5 to about 40 weight % of one or more trans-p-[5-(4-alkylcyclohexyl)-2-pyrimidinyl]benzonitriles of the formula

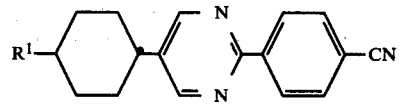

wherein $R^1$ is a straight-chain alkyl group containing 2 to 7 carbon atoms, about 10 to about 60 weight % of one or more trans-4-alkylcyclohexane carboxylic acid phenyl ester of the formula

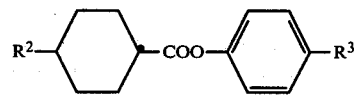

wherein $R^2$ is a straight-chain alkyl group containing 2 to 6 carbon atoms and $R^3$ is cyano or a straight-chain alkoxy group containing 1 to 6 carbon atoms, and about 0.1 to about 15 weight % of one or more coloring substances of the formula

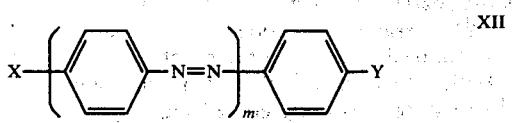

wherein m is the integer 1 and X is alkoxy and Y is nitro, or m is the integer 1 or 2, and X is p-alkoxyphenyl and Y is nitro or dialkylamino, or X is alkoxy and Y is p-nitrophenyl or p-(dialkylamino)phenyl; or m is the integer 2, and X is alkoxy and Y is alkoxy, nitro or dialkylamino, or both X and Y are dialkylamino groups; and wherein the alkoxy denotes a straight-chain alkoxy group containing 1 to 12 carbon atoms and the alkyl groups in the dialkylamino each denote a straight-chain alkyl group containing 1 to 4 carbon atoms.

2. A coloring substance-containing liquid crystal mixture, in accordance with claim 1, which contains about 0.1 to about 10 weight % of one or more coloring substances of the formula

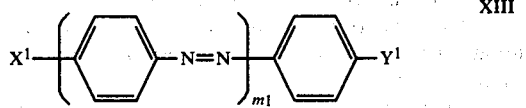

wherein $m_1$ is the integer 1, and $X^1$ is alkoxy and $Y^1$ is nitro, p-nitrophenyl or p-(dialkylamino)phenyl, or $X^1$ is p-alkoxyphenyl and $Y^1$ is nitro or dialkylamino; or $m_1$ is the integer 2, and $X^1$ is p-alkoxyphenyl and $Y^1$ is nitro, or $X^1$ is alkoxy and $Y^1$ is p-nitrophenyl, alkoxy or nitro; and wherein the alkoxy denotes a straight-chain alkoxy group containing 1 to 12 carbon atoms and the alkyl groups in the dialkylamino each denote a straight-chain alkyl group containing 1 to 4 carbon atoms.

3. A coloring substance-containing liquid crystal mixture, in accordance with claim 1, wherein the coloring substance is present from about 0.1 to about 5 weight % and comprises one or more coloring substances of the formula

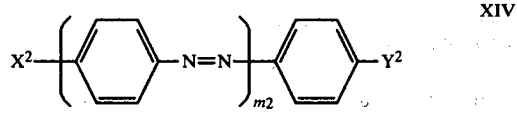

wherein $m_2$ is the integer 2, and $X^2$ is p-alkoxyphenyl and $Y^2$ is dialkylamino, or $X^2$ is alkoxy and $Y^2$ is p-(dialkylamino)phenyl or dialkylamino, or both $X^2$ and $Y^2$ are dialkylamino groups; and wherein the alkoxy denotes a straight-chain alkoxy group containing 1 to 12 carbon atoms and the alkyl groups in the dialkylamino each denote a straight-chain alkyl group containing 1 to 4 carbon atoms.

4. A coloring substance-containing liquid crystal mixture, in accordance with claim 1, which contains in addition one or more coloring substances of the formula

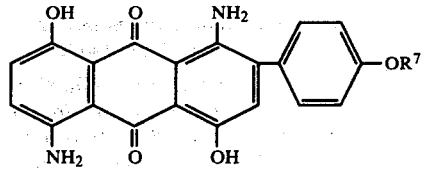

wherein $R^7$ is a straight-chain alkyl group containing 5 to 8 carbon atoms, in an amount of about 0.1 to about 5 weight %.

5. A coloring substance-containing liquid crystal mixture, in accordance with claim 4, which contains one or more coloring substances of formula VI in an amount of up to about 3 weight %.

6. A coloring substance-containing liquid crystal mixture, in accordance with claim 1, which also contains one or more optically active compounds of the formula

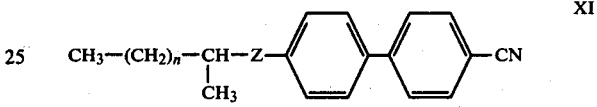

wherein Z is the group —CH$_2$— or —CH$_2$O— and n is the integer 1, 2, 3 or 4, in an amount of up to about 4 weight %.

7. A coloring substance-containing liquid crystal mixture, in accordance with claim 6, wherein the optically active additive is (+)- or (−)-4'-(2-methylbutyl)-4-cyanobiphenyl or (+)- or (−)-4'-(2-methylbutyloxy)-4-cyanobiphenyl.

8. A coloring substance-containing liquid crystal mixture, in accordance with claim 1 or 6, wherein, in the compound of formula XII, the alkoxy group is a straight-chain alkoxy group containing 3 to 9 carbon atms, and the alkyl group in the dialkylamino is methyl or ethyl.

9. A coloring substance-containing liquid crystal mixture, in accordance with claim 1 or 6, wherein the coloring substance comprises one or more compounds selected from the group consisting of compounds of the formulas

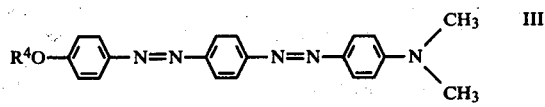

wherein $R^4$ is a straight-chain alkyl group containing 1 to 9 carbon atoms, and

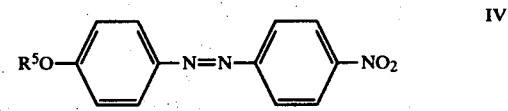

wherein $R^5$ is a straight-chain alkyl group containing 1 to 9 carbon atoms, and wherein one or more of the compounds of formula III are present in an amount of 0 to about 3 weight % and the compounds of formula IV are present in an amount of 0 to about 10 weight %, provided that the sum of the amounts of coloring substances of formulas III and/or IV present is at least about 0.3 weight %.

10. A coloring substance-containing liquid crystal mixture, in accordance with claim 1, 2, 3, 4 or 6, which contains in addition one or more of the following groups of liquid crystals: (a) up to about 50 weight % of one or more 4-cyanobiphenyls of the formula

VII wherein $R^8$ is a straight-chain alkyl or alkoxy group containing 2 to 8 carbon atoms and $R^9$ is cyano;

(b) up to about 30 weight % of one or more p-(5-alkyl-2-pyrimidinyl)benzonitriles of the formula

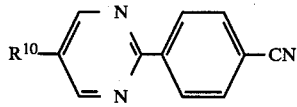

VIII wherein $R^{10}$ is a straight-chain alkyl group containing 2 to 7 carbon atoms;

(c) up to about 10 weight % of one or more 4''-alkyl-4-cyano-p-terphenyls of the formula

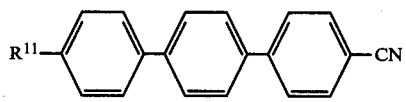

IX wherein $R^{11}$ is a straight-chain alkyl group containing 3 to 7 carbon atoms, (d) up to about 15 weight % of one or more p-alkylbenzoic acid p'-cyanophenyl esters of the formula

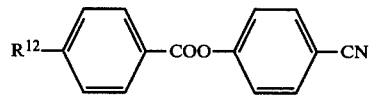

X wherein $R^{12}$ is a straight-chain alkyl group containing 2 to 7 carbon atoms; or (e) up to about 12 weight % of one or more 2-(4-cyanophenyl)-5-(4-alkylphenyl)pyrimidines of the formula

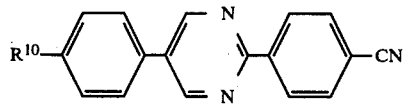

XVI wherein $R^{10}$ is a straight-chain alkyl group containing 2 to 7 carbon atoms.

11. A coloring substance-containing liquid crystal mixture, in accordance with claim 9, wherein $R^4$ in the compound of formula III is heptyl, and $R^5$ in the compound of formula IV is methyl or heptyl.

12. A coloring substance-containing liquid crystal mixture, in accordance with claim 4, wherein the total concentration of the compounds of formulas VI and XII is about 0.3 to about 10 weight %.

13. A coloring substance-containing liquid crystal mixture, in accordance with claim 4, wherein the total concentration of the compounds of formulas VI and XII is about 0.3 to about 5 weight %.

14. A coloring substance-containing liquid crystal mixture, in accordance with claim 2, wherein the amount of one or more coloring substances present comprises from about 0.3 to about 1.4 parts by weight.

15. A coloring substance-containing liquid crystal mixture, in accordance with claim 2, wherein, in the compound of formula XIII, the alkoxy group is a straight-chain alkoxy group containing 3 to 9 carbon atoms, and the alkyl group in the dialkylamino is methyl or ethyl.

16. A coloring substance-containing liquid crystal mixture, in accordance with claim 3, wherein, in the compound of formula XIV, the alkoxy group is a straight-chain alkoxy group containing 3 to 9 carbon atoms, and the alkyl group in the dialkylamino is methyl or ethyl.

17. A coloring substance-containing liquid crystal mixture, in accordance with claim 3, wherein the amount of one or more coloring substances present comprises from about 0.4 to about 1.4 parts by weight.

18. A coloring substance-containing liquid crystal mixture, in accordance with claim 4, wherein the amount of one or more coloring substances present comprises from about 1.0 to about 2.2 parts by weight.

19. A coloring substance-containing liquid crystal mixture comprising trans-p-[5-(4-ethylcyclohexyl)-2-pyrimidinyl]benzonitrile, trans-p-[5-(4-pentylcyclohexyl)-2-pyrimidinyl]benzonitrile, trans-p-[5-(4-heptylcyclohexyl)-2-pyrimidinyl]benzonitrile, trans-4-propylcyclohexane carboxylic acid p-cyanophenyl ester, trans-4-pentylcyclohexane carboxylic acid p-cyanophenyl ester, trans-4-butylcyclohexane carboxylic acid p-(ethoxy)phenyl ester, trans-4-pentylcyclohexane carboxylic acid p-(methoxy)-phenyl ester, 4'-pentyl-4-cyanobiphenyl, one or more coloring substances selected from the group consisting of compounds of the formulas

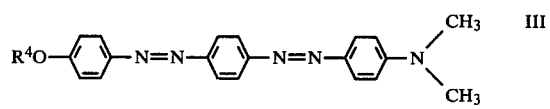

III wherein $R^4$ is a straight-chain alkyl group containing 1 to 9 carbon atoms,

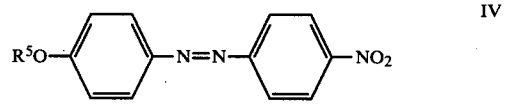

IV wherein $R^5$ is a straight-chain alkyl group containing 1 to 9 carbon atoms, and

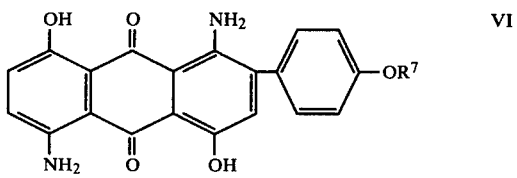

VI wherein $R^7$ is a straight-chain alkyl group containing 5 to 8 carbon atoms, optically active 4'-(2-methylbutyl)-4-cyanobiphenyl and optically active 4'-(2-methylbutyloxy)-4-cyanobiphenyl, with the proviso that at least one of the coloring substances is selected from the group consisting of compounds of formulas III and IV.

20. A coloring substance-containing liquid crystal mixture, in accordance with claim 19, which contains about 7.73 parts by weight of trans-p-[5-(4-ethylcyclohexyl)-2-pyrimidinyl]benzonitrile, about 5.52 parts by weight of trans-p-[5-(4-pentylcyclohexyl)-2-pyrimidinyl]benzonitrile, about 14.38 parts by weight of trans-p-[5-(4-heptylcyclohexyl)-2-pyrimidinyl]benzonitrile, about 7.64 parts by weight of trans-4-propylcyclohexane carboxylic acid p-cyanophenyl ester, about 6.95 parts by weight of trans-4-pentylcyclohexane carboxylic acid p-cyanophenyl ester, about 14.13 parts by weight of trans-4-butylcyclohexane carboxylic acid p-(ethoxy)-phenyl ester, about 12.62 parts by weight of trans-4-pentylcyclohexane carboxylic p-(methoxy)phenyl ester, about 27.28 parts by weight of 4'-pentyl-4-cyanobiphenyl, about 0.95 parts by weight of the compound of formula III wherein $R^4$ is heptyl, about 1 part by weight of the compound of formula IV wherein $R^5$ is methyl or heptyl, about 1.80 parts by weight of the compound of formula VI wherein $R^7$ is heptyl and up to about 4 parts by weight of a compound selected from the group consisting of optically active 4'-(2-methylbutyl)-4-cyanobiphenyl and optically active 4'-(2-methylbutyloxy)-4-cyanobiphenyl.

* * * * *